United States Patent [19]
Spirit

[11] Patent Number: 5,504,617
[45] Date of Patent: Apr. 2, 1996

[54] OPTICAL TIME DOMAIN REFLECTOMETRY

[75] Inventor: David M. Spirit, Suffolk, England

[73] Assignee: British Telecommunications public limited company, London, England

[21] Appl. No.: 230,370

[22] Filed: Apr. 20, 1994

[30] Foreign Application Priority Data

Feb. 8, 1994 [EP] European Pat. Off. ............... 94300897

[51] Int. Cl.$^6$ .................................................. H04B 10/08
[52] U.S. Cl. ............................................ 359/341; 359/110
[58] Field of Search ..................................... 359/341, 114, 359/110; 385/15, 24, 27, 42

[56] References Cited

U.S. PATENT DOCUMENTS

| | | | |
|---|---|---|---|
| 5,214,728 | 5/1993 | Shigematsu et al. | 385/24 |
| 5,280,549 | 1/1994 | Barnard et al. | 385/15 |
| 5,319,482 | 6/1994 | Tsuchiya et al. | 359/110 |
| 5,363,463 | 11/1994 | Kleinerman | 385/123 |
| 5,396,569 | 3/1995 | Yanagawa et al. | 385/24 |

FOREIGN PATENT DOCUMENTS 2264018  8/1993  United Kingdom .
WO93/02344  2/1993  WIPO .

OTHER PUBLICATIONS

Nakazawa et al, "Gain–Distribution Measurements along an Ultralong Erbium–Doped Fiber Amplifier Using Optical-–Time–Domain Reflectometry", Optics Letters, pp. 1200–1202, vol. 15, No. 21, 1 Nov. 1990, New York.

Mackichan et al, "Innovative Approach to Interspan Fibre Break Location in Fibre Amplifier Repeatered Communication", Electronics Letters, vol. 28, No. 7, 26 Mar. 1992, Stevenage GB, pp. 626–628.

Cheng et al, "Novel Configuration of an Erbium–Doped Fiber Amplifier Using an Optical Circulator", Optical Fiber Communication Conference OFC '92, vol. 5, No. TUL5, 2 Feb. 1992, San Jose, California, p. 69.

Primary Examiner—Mark Hellner
Attorney, Agent, or Firm—Nixon & Vanderhye

[57] ABSTRACT

A waveguide carrying system signals at a first wavelength and OTDR signals at a second wavelength is provided with an optical amplifier and an isolator. The isolator has a high isolation factor at the first wavelength and a low isolation factor at the second wavelength.

15 Claims, 1 Drawing Sheet

OPTICAL TIME DOMAIN REFLECTOMETRY

BACKGROUND OF THE INVENTION

1. Field of the Invention

This invention relates to optical time domain reflectometry (OTDR).

2. Related Art

In OTDR, an optical pulse is launched into an optical fibre (or more generally into a waveguide—in this specification the expression 'optical fibre' is used to include the more general case of a waveguide as well as an optical fibre)—and backscattered signals returning to the launch end are monitored. In the event that there are discontinuities (such as faults or splices) in the fibre, the amount of backscattering generally increases, and any such change is detected in the monitored signals. Backscattering and reflection also occur from elements such as couplers, and so the monitored signals are usually compared with a reference record, new peaks and other changes in the monitored signal level or plot being indicative of changes in the fibre path, normally indicating a fault. The time between pulse launch and receipt of a backscattered signal is proportional to the distance along the fibre to the source of the backscattering, and so OTDR is a useful technique for fault location.

The rapid evolution of erbium-doped fibre amplifiers has freed telecommunications system designers from the constraints of opto-electronic regenerators. It is now possible to conceive of a future fixed transport layer where the links may be upgraded simply by modifying the terminal equipment. Similarly, it will reduce operations and maintenance costs if fault location can also be enabled remotely from the terminal locations. The application of OTDR to an optically amplified system was first successfully demonstrated for semiconductor laser amplifiers (SLAs)—see Blank & Cox—'Optical Time Domain Reflectometry on Optical Amplifier Systems', Journal of Lightwave Technology, vol. 7, no. 10, pages 1549–1555. The major obstacle overcome was that the amplifiers produce amplified spontaneous emission (ASE), and this may be sufficient to overload the OTDR receiver. The technique used by Blank and Cox was primarily that of limiting the optical bandwidth of the test pulse and the ASE spectrum incident on the receiver, and using additional electrical processing in the OTDR to deal with the residual ASE. A narrowband optical filter was placed at the output of an OTDR instrument to limit the level of ASE entering the receiver. The optical output from the standard Fabry-Perot laser normally used in OTDR instruments would have been severely attenuated by the filter response, and so the OTDR laser was replaced with a narrow linewidth DFB laser, matched to the filter response. No further modifications were required to the commercial OTDR instrument (Hewlett-Packard HP8145A).

Unfortunately, this technique can only be used in systems which do not include in-line optical isolators. For the majority of systems, however, it is necessary (or at least desirable) to include at least one optical isolator in-line with each fibre amplifier to ensure system stability under all conditions. Thus, the control of ASE in systems having a plurality of amplifiers is important—if the ASE of one amplifier is sufficiently large, it will be amplified by the other amplifiers in the system (ASE travels in both directions), and this can cause the entire system to oscillate (lase). The use of in-line optical isolators prevents oscillations, as effectively light signals can travel in only one direction. Typical values for the isolation are likely to be in the range 30–40 dB. Not only does this preclude system upgrades to bi-directional working, but it also removes any possibilities for enabling fault location using OTDR at the system wavelength. A number of schemes have been suggested as ways of addressing this issue. Unfortunately, these schemes involve the use of optical circulators, routing the "go" and "return" paths through separate amplifiers, and the extra complexity involved is likely to be justified only in specialised applications.

SUMMARY OF THE INVENTION

The present invention provides optical amplifier means for a waveguide carrying system signals at a first wavelength and OTDR signals at a second wavelength, the amplifier means being constituted by an optical amplifier and an isolator, wherein the isolator has a high isolation factor at the first wavelength and a low isolation factor at the second wavelength.

Thus, by ensuring that the isolation factor is high at the first wavelength, system signals can only travel in one direction (thereby ensuring system stability), whilst OTDR signals can travel in both directions (thereby permitting monitoring of the waveguide).

Preferably, the isolator has an isolation factor of at least 30 dB at the first wavelength, and an isolation factor of at most 15 dB at the second wavelength.

In a preferred embodiment, the waveguide is an optical fibre, and the optical amplifier is a rare earth doped fibre amplifier which is provided with a pump laser, the doped fibre being connected to said optical fibre and to the pump laser by means of a WDM coupler.

In this case, the WDM coupler has a low loss at the first and second wavelengths.

The WDM coupler may be a fused fibre coupler or a dichroic coupler.

Alternatively, the waveguide is an optical fibre and the optical amplifier is an SLA.

The invention also provides an optical telecommunications system comprising a waveguide, an optical signal transmitter for launching system signals at a first wavelength into the waveguide, and an OTDR for launching OTDR signals at a second wavelength into the waveguide, wherein the waveguide is provided with optical amplifier means as defined above.

Preferably, the waveguide is an optical fibre, and the first wavelength lies in the 1300 nm low loss window for optical fibres, and the second wavelength lies in the 1500 nm low loss window for optical fibres. In this case, the rare earth doped fibre amplifier may be an erbium doped fibre amplifier, and the pump laser may operate at a wavelength of 1480 nm.

When the amplifier is an SLA, the first wavelength preferably lies within the 1300 nm low loss window for optical fibres, and the second wavelength lies in the 1500 nm low loss window for optical fibres.

BRIEF DESCRIPTION OF THE DRAWINGS

The invention will now be described in greater detail, by way of example, with reference to the accompanying drawings, in which.

DETAILED DESCRIPTION OF EXEMPLARY EMBODIMENTS OF THE INVENTION

Figure 1:
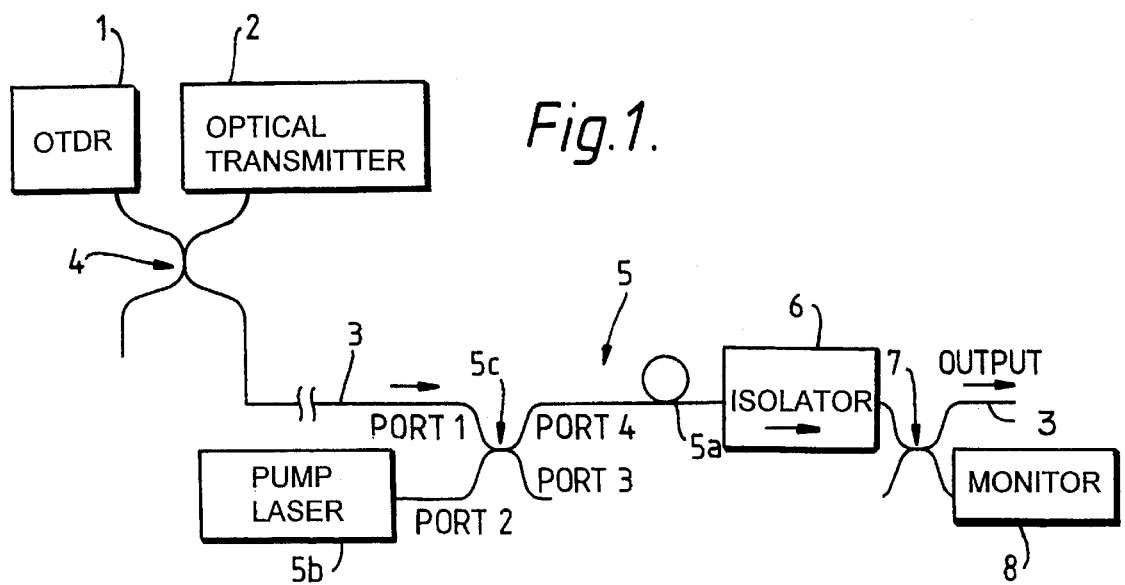
FIG. 1 is a schematic diagram showing an embodiment of the invention.

Referring to the drawings, FIG. 1 shows an OTDR arrangement and part of an associated optical fibre telecommunications line to be tested. The arrangement has a head end which includes an OTDR 1 and an optical transmitter 2 which are connected to an optical fibre telecommunications line 3 via a WDM coupler 4. The OTDR 1 operates at a wavelength $\lambda_{OTDR}$ in the 1300 nm window. The optical transmitter 2 operates at a wavelength $\lambda_{system}$ in the 1500 nm window, and constitutes a terminal transmitter of system signals.

The line 3 incorporates a fibre amplifier, indicated generally by the reference numeral 5, and an isolator 6. The fibre amplifier 5 is constituted by a 60 m length of erbium-doped fibre 5a, a pump laser 5b and a fused fibre WDM coupler 5c having four ports numbered 1, 2, 3 and 4. Although the erbium-doped fibre can be of any length, it is preferable for its length to lie within the range of from 20 m to 100 m. The pump laser 5b operates at a wavelength $\lambda_{pump}$ of 1480 nm, and the WDM coupler 5c couples light at the system wavelength $\lambda_{system}$ and light at the OTDR wavelength $\lambda_{OTDR}$ (from port 1) and light from the pump at $\lambda_{pump}$ (from port 2) to the erbium-doped fibre 5a via port 4. The isolator 6 is, for example, a BT&D OIC1100–1550 whose output is connected to the line 3 downstream thereof via one output leg of a coupler 7. The other output leg of the coupler 7 is connected to a monitor 8.

The WDM coupler 5c is arranged to have a low loss (from port 1 to port 4) at both the system wavelength $\lambda_{system}$ and the OTDR wavelength $\lambda_{OTDR}$. The doped fibre 5a is arranged to have a high gain at the system wavelength $\lambda_{system}$ and substantially no loss at the OTDR wavelength $\lambda_{OTDR}$. The isolator 6 is arranged to have a high isolation at the system wavelength $\lambda_{system}$ and a low isolation at the OTDR wavelength $\lambda_{OTDR}$. In use, therefore, the fibre amplifier 5 is effective to amplify signals at the system wavelength $\lambda_{system}$ without substantially amplifying signals at the OTDR wavelength $\lambda_{OTDR}$, and the isolator 6 is such as to provide a high isolation factor for signals at the system wavelength $\lambda_{system}$ (thereby preventing light at this wavelength travelling backwards towards the head end of the system and so ensuring system stability), while providing low isolation at the OTDR wavelength $\lambda_{OTDR}$ (thereby permitting signals at this wavelength to pass in both directions along the line 3 so that returning backscattered and reflected signals at this wavelength can reach the OTDR 1). In other words, the wavelength $\lambda_{OTDR}$ of the laser in the OTDR 1 should be selected as follows:

1. so that there is poor isolation at the isolator 6;
2. so that the signal is unaffected by the doped fibre 5a (that is to say $\lambda_{OTDR}$ is out of the amplification bandwidth and experiences no absorbtion); and
3. so that light from the OTDR 1 passes through the WDM coupler 5c with low loss.

For the 1480 nm-pumped erbium-doped fibre amplifier 5, this implies that the OTDR 1 is equipped with a laser in the 1300 nm window. The tolerance on the OTDR wavelength $\lambda_{OTDR}$ depends on the type of WDM coupler used, and is tighter for a fused fibre coupler than for a dichroic coupler.

None the less, a Fabry Perot laser of approximately 5 nm bandwidth would be satisfactory.

It will be apparent that, in considering OTDR through the amplifier 5, the signal path consists of the WDM coupler 5c, the fibre 5a and the isolator 6. The wavelength responses of these components will be considered below in more detail:

1. The isolator 6—all standard techniques of optical isolation use Faraday rotation in a magneto-optically active material. The general construction of an isolator is based on a crystal which is saturated with a high-flux magnetic field. The level of Faraday rotation in the crystal has to be sufficient to cause a rotation of the plane of polarisation of instant light by $\pi/4$ radians. In this way, the "go" and "return" light are in orthogonal polarisation states at the input to the crystal, and may be separated by a polariser. However, the level of Faraday rotation is a slowly-varying function of the signal wavelength. The implication of this is that the isolation provided is tuned to a range of wavelengths, so that for an isolator which gives high isolation in the 1550 nm window (say from 1540–1560 nm), a much lower level of isolation will be provided in the 1300 nm window.

2. The fibre 5a—for any rare earth dopant, the gross absorption spectrum is defined by the energy level structure of the element. Small scale changes may be introduced, for example, by changing the composition of the host material. However, the loss spectrum is generally well defined, and cannot be changed significantly. For example, erbium-doped fibre exhibits no ground-state or excited-state absorption throughout the 1300 nm transmission window, the loss being simply that due to the undoped fibre alone.

Figure 2:
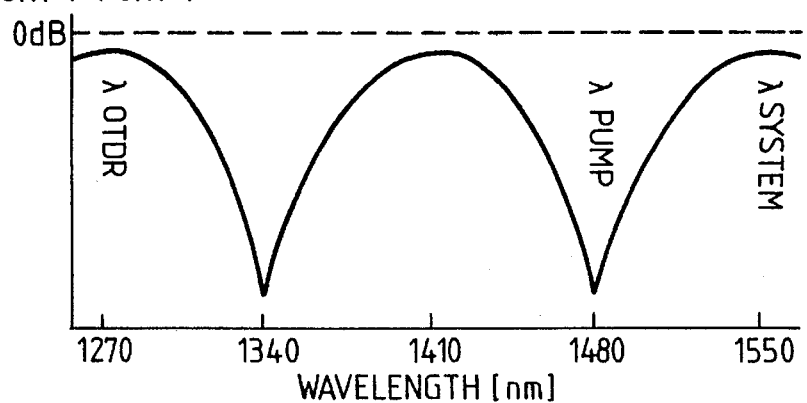
FIG. 2 is a graph illustrating the wavelength response of the WDM coupler of the embodiment of FIG. 1.

3. The WDM coupler 5c—the technique of the invention relies on the transmission of the OTDR test pulses through all the components, including the WDM coupler 5c, with relatively low loss. The fused fibre WDM coupler 5c described above has a wavelength response which is periodic, being approximately sinusoidal (see FIG. 2). As shown, the pump and signal wavelengths $\lambda_{pump}$ and $\lambda_{system}$ are separated by half a period of the coupler response. It is clear that, if the signal path is transmitted at $\lambda_{system}$, then it is also transmissive with low loss at $\lambda_{OTDR}=\lambda_{system}\pm n\Delta\lambda c$ where n is an even integer and $\Delta\lambda c=\lambda_{system}-\lambda_{pump}$. Thus, for $\lambda_{pump}=1480$ nm and $\lambda_{system}=1550$ nm, $\Delta\lambda c=70$ nm. Consequently $\lambda_{OTDR}=1410$ nm for n=2 and 1280 nm for n=4. $\lambda_{OTDR}$ at 1410 nm is not likely to be of much use, as this is within the "high" loss region of optical fibre. However, if the OTDR 1 is chosen to have a wavelength $\lambda_{OTDR}=1280$ nm, transmission at this wavelength lies firmly within the 1300 nm window where the fibre loss is low. Moreover, semiconductor lasers are readily available at this wavelength, which leads to the choice of an OTDR laser operating at 1280 nm when the WDM coupler 5c is a fused fibre coupler.

Alternatively, the fused fibre coupler could be replaced by dichroic coupler. Such a three-port device normally has a "top hat" response, with a one path low loss across a range of pump wavelengths and another one path low loss across a range of signal wavelengths. Normally, the out-of-band range of wavelengths is not of interest, and the filter response is only optimised for the pump and signal bands. In principle, however, it would not be difficult to design a dichroic coupler which would have a second low loss band to allow both the system and OTDR wavelengths to pass through with low loss.

Figure 3:
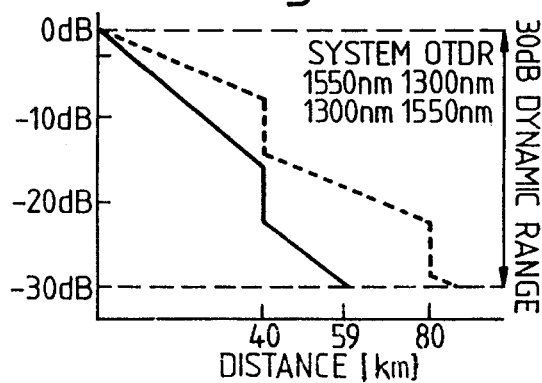
FIG. 3 is a schematic trace of the OTDR of the embodiment of FIG. 1.

As an example, the OTDR arrangement of FIG. 1 has a loss budget (the average of the "go" and "return" paths) through the amplifier 5 of 0.5 dB for the coupler 5c, 5.5 dB for the isolator 6 and 0.0 dB for the fibre 5a. Including the loss of 0.5 dB for the splices, therefore, the total loss of the amplifier 5 is 6.5 dB at $\lambda_{OTDR}$. The loss of a single mode optical fibre in the 1300 nm window is about 0.4 dB/km, so the loss in the amplifier 5 is equivalent to 16.25 km of fibre. The dynamic range of state of the art 1300 nm OTDR instruments is about 30 dB (that is to say 75 km of fibre). FIG. 3 shows a schematic OTDR trace obtained using the arrangement of FIG. 1, from which it will be noted that fibre beyond the amplifier can be observed, which is not possible using conventional techniques. For long-haul (trunk) transmission, where fibres typically have a chain of amplifiers, it is unlikely that the amplifier spacing will be sufficiently low to permit OTDR observations as far as the second amplifier in such a chain. The position in the access network will, however, be different, and it is probable that few, if any, access fibres will be provided with more than one amplifier, so that the technique of the invention should find wide application in fibre access networks.

The position improves somewhat if the wavelengths are reversed, that is to say if $\lambda_{system}$ is in the 1300 nm window and $\lambda_{OTDR}$ is in the 1550 nm window. In this case, the amplifier loss is similar, but the equivalent length of fibre is doubled, since the fibre attenuation is halved. Thus, considering a system with 40 km amplifier spacing, the loss per span (40 km fibre at 0.2 dB/km+6.5 dB amplifier loss) is now 14.5 dB. This implies that a 1550 nm OTDR with 30 dB dynamic range could observe two complete spans (including two amplifiers), as shown in FIG. 3. Thus, by using OTDR from each end, an optically-amplified system of a least 160 km in length could be monitored using the technique of the invention.

In an alternative embodiment, the fibre amplifier 5 could be replaced by an SLA. In this case, of course, the SLA would be spliced directly into the optical fibre telecommunications line 3, and there would be no need for either a WDM coupler or a pump laser. Here again, however, the isolator should have a high isolation factor at the system wavelength $\lambda_{system}$ and a low isolation factor at the OTDR wavelength $\lambda_{OTDR}$. In this case, however, the OTDR wavelength $\lambda_{OTDR}$ must be longer than the system wavelength $\lambda_{system}$, otherwise the OTDR signals would be absorbed in the SLA. This implies that the system wavelength $\lambda_{system}$ should be in the 1300 nm low loss window for optical fibres, and the OTDR wavelength $\lambda_{OTDR}$ should be in the 1500 nm low loss window for optical fibres.

It will be apparent that the arrangement described above could be modified in a number of ways. For example, the principle of using OTDR at a wavelength which is different from that of the system signals could be used with optical components other than an optical amplifier combined with an optical isolator. For example, the invention could be used with an in-line optical isolator which is not associated with an amplifier. It would also be possible to use the invention with a coupler which has a first predetermined splitting ratio at the system wavelength, and a second predetermined splitting ratio at the OTDR wavelength. Such a system could be used to interrogate preferentially fibre along a specified route downstream of the coupler. Again, it would be possible to use the invention where an optical fibre telecommunications line includes an attenuator. In this case, the attenuator could be arranged to have a high attenuation factor at the system wavelength and a much lower loss at the OTDR wavelength. All of these components, therefore, could be designed to have appropriate spectral responses to enable the use of OTDR testing at a wavelength different to that of the system signals.

It should also be noted that the system of the invention is suitable for in-service testing, that is to say that OTDR measurements can be made whilst the system laser is turned on. This would require the installation, at test points, of appropriate WDM couplers to combine the system and OTDR wavelengths.

I claim:

1. An optical amplifier system for a waveguide carrying system signals at a first wavelength and OTDR signals at a second wavelength, the amplifier system including an optical amplifier and an isolator, wherein the isolator has a high isolation factor at the first wavelength and a low isolation factor at the second wavelength, and wherein the optical amplifier has an amplification bandwidth which includes the first wavelength but not the second wavelength.

2. An optical amplifier system as in claim 1, wherein the isolator has an isolation factor of at least 30 dB at the first wavelength, and an isolation factor of at most 15 dB at the second wavelength.

3. An optical amplifier system as in claim 1, wherein the waveguide is an optical fibre and the optical amplifier is an SLA.

4. An optical amplifier system as in claim 1, wherein:

the waveguide is an optical fibre, and the optical amplifier is a rare earth doped fibre amplifier which is provided with a pump laser, the doped fibre being connected to said optical fibre and to the pump laser by means of a WDM coupler.

5. An optical amplifier system as in claim 4, wherein the WDM coupler has a low loss at the first and second wavelengths.

6. An optical amplifier system as in claim 4, wherein the WDM coupler includes a fused fibre WDM coupler.

7. An optical amplifier system as in claim 4, wherein the WMD coupler includes a dichroic coupler.

8. An optical telecommunications system comprising:

a waveguide, an optical signal transmitter for launching system signals at a first wavelength into the waveguide, and an OTDR for launching OTDR signals at a second wavelength into the waveguide, wherein the waveguide is provided with an optical amplifier system as in claim 1.

9. A system as in claim 8, wherein:

the waveguide includes an optical fibre, the first wavelength lies in a 1300 nm low loss window for said optical fibre, and the second wavelength lies in a 1500 nm low loss window for said optical fibre.

10. A system as in claim 9, wherein:

the optical fibre amplifier is an erbium doped fibre amplifier which is provided with a pump laser, and the pump laser operates at a wavelength of 1480 nm.

11. A system as in claim 8, wherein:

the waveguide includes an optical fibre having 1300 nm and 1500 nm low loss windows, the first wavelength lies within the 1300 nm low loss window for said optical fibre, and the second wavelength lies in the 1500 nm low loss window for said optical fibre.

12. An optical telecommunications system comprising:

a waveguide, an optical signal transmitter for launching system signals at a first wavelength into the waveguide, and an OTDR for launching OTDR signals at a second wavelength into the waveguide, wherein the waveguide is connected in series with at least one optical component having an operational characteristic which has different values at the first and second wavelengths which permits substantially only unidirectional passage at said first wavelength and substantially bi-directional passage at said second wavelength.

13. A system as in claim 12, wherein the at least one optical component includes an optical isolator having a high isolation factor at the first wavelength and a low isolation factor at the second wavelength.

14. A system as in claim 12, wherein the at least one optical component includes a coupler having a first splitting ratio at the first wavelength and a second splitting ratio at the second wavelength.

15. A system as in claim 13, wherein the at least one optical component includes an optical attenuator having a first, high attenuation factor at the first wavelength and a second, low attenuation factor at the second wavelength.

* * * * *